(12) United States Patent
Branco et al.

(10) Patent No.: US 10,248,486 B2
(45) Date of Patent: Apr. 2, 2019

(54) MEMORY MONITOR

(71) Applicant: Intel Corporation, Santa Clara, CA (US)

(72) Inventors: Rodrigo R. Branco, Hillsboro, OR (US); Shay Gueron, Haifa (IL)

(73) Assignee: Intel Corporation, Santa Clara, CA (US)

( * ) Notice: Subject to any disclaimer, the term of this patent is extended or adjusted under 35 U.S.C. 154(b) by 123 days.

(21) Appl. No.: 15/279,697

(22) Filed: Sep. 29, 2016

(65) Prior Publication Data
US 2018/0089015 A1    Mar. 29, 2018

(51) Int. Cl.
*G06F 11/07*  (2006.01)
*G06F 21/50*  (2013.01)
*G06F 9/4401* (2018.01)

(52) U.S. Cl.
CPC ........ *G06F 11/0757* (2013.01); *G06F 9/4418* (2013.01); *G06F 21/50* (2013.01); *G06F 2221/034* (2013.01)

(58) Field of Classification Search
CPC . G06F 11/0757; G06F 21/50; G06F 2221/034
USPC ........................ 714/55; 726/34–36
See application file for complete search history.

(56) References Cited

U.S. PATENT DOCUMENTS

| | | | | |
|---|---|---|---|---|
| 6,247,151 B1 * | 6/2001 | Poisner | ............... | G06F 11/1004 365/201 |
| 6,418,070 B1 * | 7/2002 | Harrington | .......... | G11C 7/1072 365/201 |
| 7,124,329 B2 * | 10/2006 | Ackaret | ................ | G06F 11/076 714/42 |
| 7,171,605 B2 * | 1/2007 | White | ................... | G06F 11/106 714/754 |
| 7,376,887 B2 * | 5/2008 | Arnez | .................... | G11C 29/42 714/768 |
| 2002/0194557 A1 * | 12/2002 | Park | ....................... | G11C 29/20 714/718 |
| 2008/0307240 A1 | 12/2008 | Dahan et al. | | |
| 2009/0292904 A1 | 11/2009 | Henry et al. | | |
| 2010/0332902 A1 | 12/2010 | Banginwar et al. | | |
| 2012/0131365 A1 | 5/2012 | Tabone et al. | | |
| 2014/0351673 A1 * | 11/2014 | Ware | .................... | G11C 29/785 714/764 |

(Continued)

FOREIGN PATENT DOCUMENTS

WO    WO-2018063555 A1    4/2018

OTHER PUBLICATIONS

"International Application Serial No. PCT/US2017/047194, International Search Report dated Nov. 27, 2017", 5 pgs.

(Continued)

*Primary Examiner* — Joseph R Kudirka
(74) *Attorney, Agent, or Firm* — Schwegman Lundberg & Woessner, P.A.

(57) ABSTRACT

Various systems and methods for providing a memory monitor are provided herein. An integrated circuit and memory are disposed in a computer system. The integrated circuit to monitor main memory includes: a detection circuit to detect that the computer system enters a sleep state; a test circuit to test for the presence of the main memory; and a recovery circuit to perform a recovery process when the test fails.

25 Claims, 4 Drawing Sheets

(56) References Cited

U.S. PATENT DOCUMENTS

2015/0185804 A1     7/2015   Jun et al.
2016/0111170 A1*   4/2016   Zhao .................. G01R 31/3177
                                                                     714/719

OTHER PUBLICATIONS

"International Application Serial No. PCT/US2017/047194, Written Opinion dated Nov. 27, 2017", 6 pgs.
Halderman, J Alex, et al., "Lest We Remember: Cold Boot Attacks on Encryption Keys", Proc USENIX Association 17th USENIX Security Symposium, (Jul. 2008), 45-60.

* cited by examiner

MEMORY MONITOR

TECHNICAL FIELD

Embodiments described herein generally relate to memory controllers and in particular, to a memory monitor.

BACKGROUND

Dynamic random-access memory (DRAM) is very commonly used in desktop, mobile, server, and other types of compute devices. DRAM stores each bit of data in a separate capacitor within an integrated circuit. DRAM's capacitors store the charge representing a zero or one, and slowly discharge over seconds or minutes. One attack vector for malicious actors is to remove the DRAM from the host computer and read the DRAM in a second computer before the capacitor charge is fully dissipated. The DRAM may be modified at the second computer and replaced in the host computer, which may alter the host computer's operation or install malicious code or data on the host computer.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, numerous specific details are set forth in order to provide a thorough understanding of some example embodiments. It will be evident, however, to one skilled in the art that the present disclosure may be practiced without these specific details.

Disclosed herein are systems and methods that provide a memory monitor to defeat a hacking attempt on memory. Memory is constructed from what is basically a capacitor. Each memory cell encodes a single bit. The charge of the capacitor indicates its value. Depending on the design, memory types couple the cell to either power or ground. A memory cell will decay to a ground state, which will represent either a zero or a one, depending on whether the memory cell is coupled to power or ground. In order to maintain the memory contents, the memory is periodically refreshed. In other words, the memory cell's capacitor is recharged.

Memory remanence denotes data retention due to a slowly discharging capacitor. Data is retained for a short period after power is lost. The period may be extended by cooling the memory module, but even without cooling, data may be recovered for several seconds after power is removed. This is enough time for an attacker to remove the memory module and put it into a new computer prepared by the attacker, where the memory contents may be accessed. This "hot swapping" of memory denies the original host BIOS and other hardware the opportunity to clear the memory on shutdown or reboot.

Using this mechanism or other similar attacks, an enterprising attacker may remove the memory modules while the computer is powered on and read sensitive or private information from the memory modules using a different machine. The attacker may gain passwords, encryption keys, or other data for later use. The attacker may also rewrite certain portions of memory and reinstall the memory module in the original machine, thus injecting malicious data or code. What is needed is a mechanism to defeat this type of attack and its variants.

Figure 1:
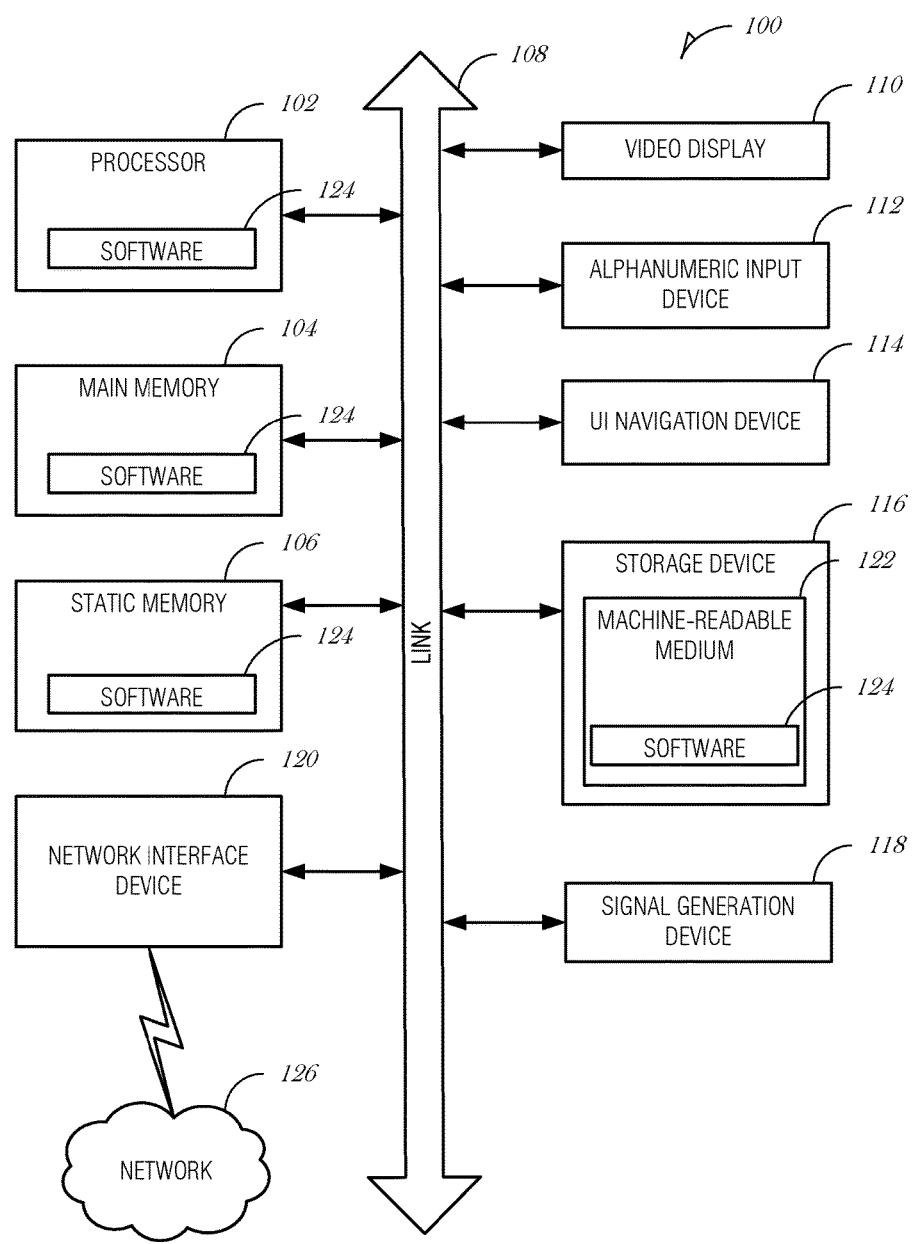
FIG. 1 is a block diagram illustrating a computer system, according to an example embodiment.

FIG. 1 is a block diagram illustrating a computer system 100 in the example form of a general-purpose machine, according to an example embodiment. In a networked deployment, the computer system 100 may operate in the capacity of either a server or a client machine in server-client network environments, or it may act as a peer machine in peer-to-peer (or distributed) network environments.

Example computer system 100 includes at least one processor 102 (e.g., a central processing unit (CPU), a graphics processing unit (GPU) or both, processor cores, compute nodes, etc.), a main memory 104 and a static memory 106, which communicate with each other via a link 108 (e.g., bus). The computer system 100 may further include a video display unit 110, an alphanumeric input device 112 (e.g., a keyboard), and a user interface (UI) navigation device 114 (e.g., a mouse). In an embodiment, the video display unit 110, input device 112, and UI navigation device 114 are incorporated into a touch screen display. The computer system 100 may additionally include a storage device 116 (e.g., a drive unit), a signal generation device 118 (e.g., a speaker), a network interface device (NID) 120, and one or more sensors (not shown), such as a global positioning system (GPS) sensor, compass, accelerometer, or other sensor.

The storage device 116 includes a machine-readable medium 122 on which is stored one or more sets of data structures and instructions 124 (e.g., software) embodying or utilized by any one or more of the methodologies or functions described herein. The instructions 124 may also reside, completely or at least partially, within the main memory 104, static memory 106, and/or within the processor 102 during execution thereof by the computer system 100, with the main memory 104, static memory 106, and the processor 102 also constituting machine-readable media.

While the machine-readable medium 122 is illustrated in an example embodiment to be a single medium, the term "machine-readable medium" may include a single medium or multiple media (e.g., a centralized or distributed database, and/or associated caches and servers) that store the one or more instructions 124. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. Information on the machine-readable media may be encrypted.

NID 130 according to various embodiments may take any suitable form factor. In an embodiment, NID 120 is in the form of a network interface card (NIC) that interfaces with processor 102 via link 108. In an example, link 108 includes a PCI Express (PCIe) bus, including a slot into which the NIC form-factor may removably engage. In another embodiment, NID 120 is a network interface circuit laid out on a motherboard together with local link circuitry, processor interface circuitry, other input/output circuitry, memory circuitry, storage device and peripheral controller circuitry, and the like. In another embodiment, NID 120 is a peripheral that interfaces with link 108 via a peripheral input/output port such as a universal serial bus (USB) port. NID 120 transmits and receives data over transmission medium 126, which may be wired or wireless (e.g., radio frequency, infra-red or visible light spectra, etc.), fiber optics, or the like.

The instructions 124 may further be transmitted or received over a communications network 126 using a transmission medium via the NID 120 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Bluetooth, Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Figure 2:
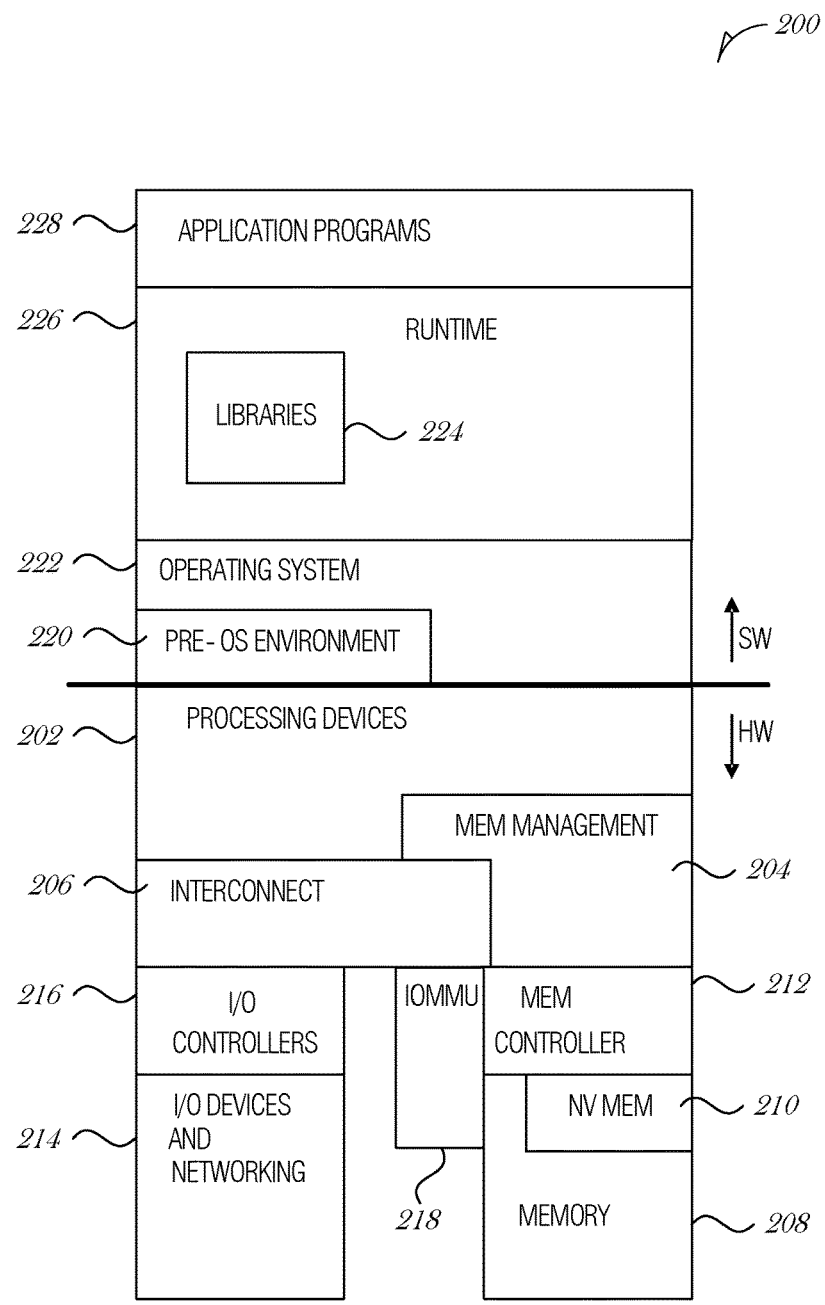
FIG. 2 is a diagram illustrating an exemplary hardware and software architecture of a computing device such as the one depicted in FIG. 1, in which various interfaces between hardware components and software components are shown.

FIG. 2 is a diagram illustrating an exemplary hardware and software architecture of a computing device such as the one depicted in FIG. 1, in which various interfaces between hardware components and software components are shown. As indicated by HW, hardware components are represented below the divider line, whereas software components denoted by SW reside above the divider line. On the hardware side, processing devices 202 (which may include one or more microprocessors, digital signal processors, etc., each having one or more processor cores, are interfaced with memory management device 204 and system interconnect 206. Memory management device 204 provides mappings between virtual memory used by processes being executed, and the physical memory. Memory management device 204 may be an integral part of a central processing unit which also includes the processing devices 202.

Interconnect 206 includes a backplane such as memory, data, and control lines, as well as the interface with input/output devices, e.g., PCI, USB, etc. Memory 208 (e.g., dynamic random access memory—DRAM) and non-volatile memory 210 such as flash memory (e.g., electrically-erasable read-only memory—EEPROM, NAND Flash, NOR Flash, etc.) are interfaced with memory management device 204 and interconnect 206 via a memory controller 212. This architecture may support direct memory access (DMA) by peripherals in some embodiments. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 214, which interface with interconnect 206 via corresponding I/O controllers 216.

In a related embodiment, input/output memory management unit IOMMU 218 supports secure direct memory access (DMA) by peripherals. IOMMU 218 may provide memory protection by meditating access to memory 208 from I/O device 214. IOMMU 218 may also provide DMA memory protection in virtualized environments, where it allows certain hardware resources to be assigned to certain guest VMs running on the system, and enforces isolation between other VMs and peripherals not assigned to them.

On the software side, a pre-operating system (pre-OS) environment 220, which is executed at initial system start-up and is responsible for initiating the boot-up of the operating system. One traditional example of pre-OS environment 220 is a system basic input/output system (BIOS). In present-day systems, a unified extensible firmware interface (UEFI) may be implemented. Pre-OS environment 220, is responsible for initiating the launching of the operating system, but also provides an execution environment for embedded applications.

Operating system (OS) 222 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 222 provides device drivers, and a variety of common services such as those that facilitate interfacing with peripherals and networking, that provide abstraction for application programs so that the applications do not need to be responsible for handling the details of such common operations. Operating system 222 additionally provides a graphical user interface (GUI) that facilitates interaction with the user via peripheral devices such as a monitor, keyboard, mouse, microphone, video camera, touchscreen, and the like.

Runtime system 224 implements portions of an execution model, including such operations as putting parameters onto the stack before a function call, the behavior of disk input/output (I/O), and parallel execution-related behaviors. Runtime system 224 may also perform support services such as type checking, debugging, or code generation and optimization.

Libraries 226 include collections of program functions that provide further abstraction for application programs. These include shared libraries, dynamic linked libraries (DLLs), for example. Libraries 226 may be integral to the operating system 222, runtime system 224, or may be added-on features, or even remotely-hosted. Libraries 226 define an application program interface (API) through which a variety of function calls may be made by application programs 228 to invoke the services provided by the operating system 222. Application programs 228 are those programs that perform useful tasks for users, beyond the tasks performed by lower-level system programs that coordinate the basis operability of the computing device itself.

Figure 3:
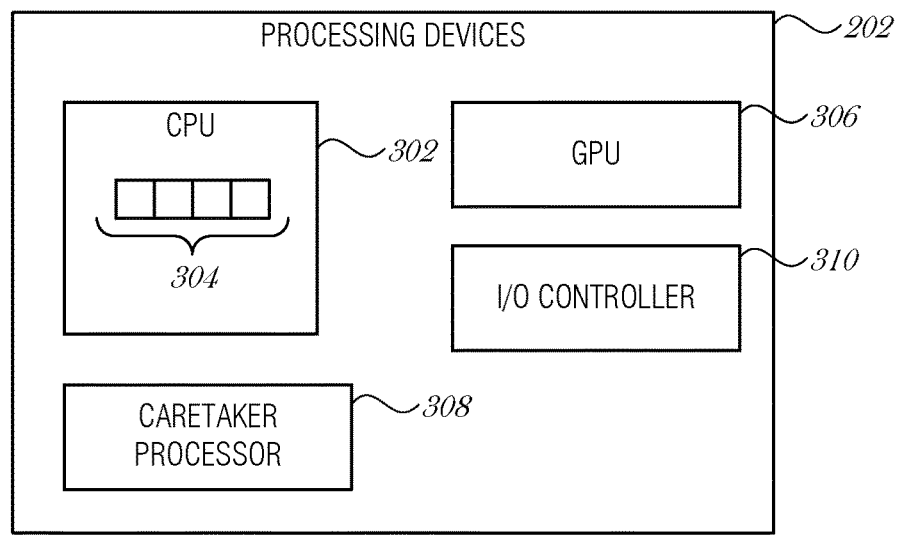
FIG. 3 is a block diagram illustrating processing devices according to some embodiments.

FIG. 3 is a block diagram illustrating processing devices 202 according to some embodiments. In an embodiment, two or more of processing devices 202 depicted are formed on a common semiconductor substrate. CPU 302 may contain one or more processing cores 304, each of which has one or more arithmetic logic units (ALU), instruction fetch units, instruction decode units, control units, registers, data stack pointers, program counters, and other components according to the particular architecture of the processor 302. As an illustrative example, CPU 302 may be an x86-type of processor. Processing devices 202 may also include a graphics processing unit (GPU) 306. In these embodiments, GPU 306 may be a specialized co-processor that offloads certain computationally-intensive operations, particularly those associated with graphics rendering, from CPU 302. Notably, CPU 302 and GPU 306 generally work collaboratively, sharing access to memory resources, I/O channels, etc.

Processing devices 202 may also include caretaker processor 308 in some embodiments. Caretaker processor 308 generally does not participate in the processing work to carry out software code as CPU 302 and GPU 306 do. In some embodiments, caretaker processor 308 does not share memory space with CPU 302 and GPU 306, and is therefore not arranged to execute operating system or application programs. Instead, caretaker processor 308 may execute dedicated firmware that supports the technical workings of CPU 302, GPU 306, and other components of the computer system. In some embodiments, caretaker processor 308 is implemented as a microcontroller device, which may be physically present on the same integrated circuit die as CPU 302, or may be present on a distinct integrated circuit die. Caretaker processor 308 may also include a dedicated set of I/O facilities to enable it to communicate with external entities. In an embodiment, caretaker processor 308 is implemented using a manageability engine (ME) or platform security processor (PSP). In another embodiment, caretaker processor 308 may take the form of a power control unit (PCU) in some system architectures.

Input/output (I/O) controller 310 coordinates information flow between the various processing devices 302, 306, 308, as well as with external circuitry, such as a system interconnect or main memory (e.g., DRAM).

Figure 4:
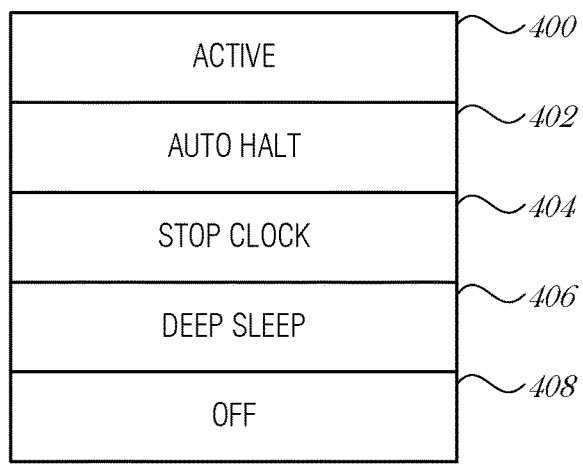
FIG. 4 is a block diagram illustrating various operating states, according to an embodiment.

FIG. 4 is a block diagram illustrating various operating states, according to an embodiment. In the active state 400, the CPU is on and operating. Each core in a multi-core CPU may have its own operating state, although some operating states are defined to include all cores.

In the auto halt state 402, the core is not executing instructions, but may return to an executing state almost instantaneously. In state 402, the core clock is off. When all cores are halted (state 402), the state 402 may be referred to as a "power on suspend" state. In the auto halt state 402 other facilities still receive power, such as the monitor, hard drives, fans, and other portions of the computing platform. This is a form of standby or sleep mode for many architectures.

The stop clock state 404 is a lower power state. The stop clock state 404 may be referred to as a "suspend to RAM" state. In the stop clock state 404, the core and bus clocks are off. The processor maintains all software-visible state in RAM, but may take longer to wake up. Context is saved in RAM and everything except the RAM is powered off.

The deep sleep state 406 is an even lower power state than the stop clock state 404. In the deep sleep state 406 the clock generator is off. In this state 406 the processor does not need to keep its cache coherent, but maintains other states. The deep sleep state 406 may be used with a hibernate mode of an operating system. Context may be saved to disk and the system power may be off. In this state, the contents of RAM are lost relatively quickly because power is shut off.

The off state 408 is when the system is powered off (e.g., soft-off) or unplugged from mains electricity (e.g., mechanism off). The off state 408 is typically achieved with a "shutdown" operating system-level command, although it may be reached using a power switch or by unplugging a system from mains electricity or battery power.

Some modern processors also feature integrated power sensors and an integrated PCU that allows the processor to perform real-time monitoring of each core's current, power, and voltage states. The PCU may be included in the semiconductor packaging with the CPU cores. The PCU may be dedicated to making the chip more efficient. The PCU handles all of the power and thermal management for the chip. Using onboard controllers and an integrated PCU allows the CPU to divert power from idle cores to active cores. This is often referred to as a turbo technology built into some processors. The turbo technology increases VCC for some cores that are under heavy load and may increase the bus speed and/or multiplier for the core, while reducing speed and/or power to other cores. As such, the PCU (or similar control unit) is in a particularly useful place where it is aware of when the processor is put into a lower-power mode and also has access to main memory. By design, the PCU is not powered off during low power modes because it is needed for processes to resume processor and system operation.

A potential vulnerability exists when the processor is put into an auto halt state 402 or a stop clock state 404. In these states, the RAM continues to have power and as such, the contents of RAM are not lost. Practically, the system typically enters an auto halt state 402 or a stop clock state 404 when the user passively or actively places the computer into a sleep mode. For instance, the user may walk away from the computer for more than some threshold time, after which the system automatically halts cores and puts the computer into a light sleep or a deeper sleep, depending on the computer's configuration. As another example, the user may close the lid of a laptop, causing the laptop computer to enter a sleep mode (e.g., stop clock state 404).

Using the PCU or other caretaker process to monitor RAM when the system is in a sleep mode allows the system to monitor itself against potential RAM theft.

Figure 5:
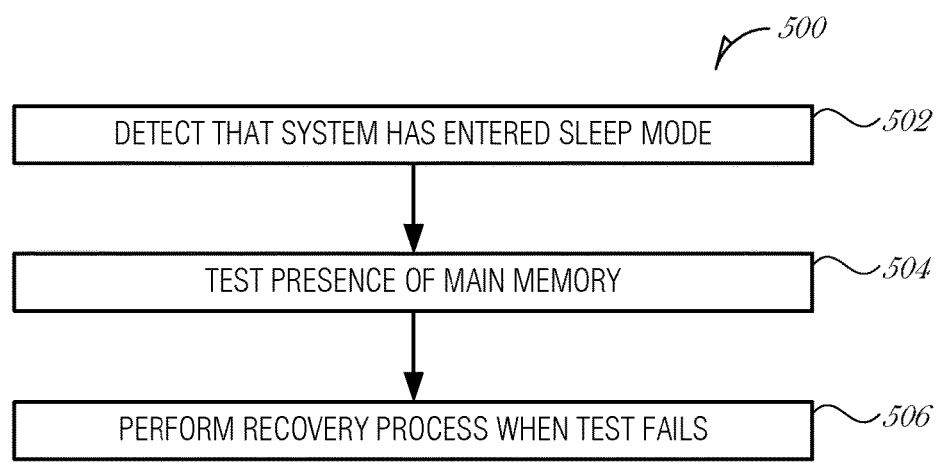
FIG. 5 is a flowchart illustrating a method of monitoring memory in a system, according to an embodiment.

FIG. 5 is a flowchart illustrating a method 500 of monitoring main memory in a system, according to an embodiment. At block 502, a caretaker processor detects that a system enters a sleep state. The sleep state may be a standby mode or a sleep mode, depending on the operating environment and user configuration.

At block 504, the caretaker processor tests for the presence of the main memory of the system. The caretaker processor may be a PCU, in an embodiment. Main memory includes DRAM installed in a computer, mobile device, laptop, or other compute device.

At block 506, a recovery process is performed when the testing fails. In an embodiment, testing the presence of the main memory is performed periodically. For instance, the test may be performed every second, every two seconds, or some other period.

In an embodiment, testing the presence of the main memory comprises accessing an address in the main memory. The address may be one that the caretaker processor regularly access, for instance, one that is used for configuration or data that the caretaker processor uses. The test may be performed on any addressable memory location though. Thus, in an embodiment, the address is a random address in main memory. In an embodiment, accessing the address is performed periodically.

In an embodiment, testing the presence of the main memory includes initiating a watchdog timer. A watchdog timer is a mechanism used to detect an event. During normal operation, the watchdog timer is regularly reset so that it does not elapse. When the watchdog timer elapses, a timeout signal is generated and an action is initiated based on the timeout signal. Using the watchdog timer, the caretaker processor is able to control the system shutdown. As such, the caretaker processor may attempt to access contents of the main memory and reset the watchdog timer when the attempt to access contents is successful. In a further embodiment, performing the recovery process occurs when the watchdog timer expires. The recovery process may be one or more actions, such as shutting the computer or system down, writing an alert, setting a system flag, or other action. Thus, in an embodiment, the recovery process comprises shutting down the system. In another embodiment, the recovery process comprises writing to an event log.

This recovery process is a mechanism to prevent both an attack where the contents of the RAM are read, and another possible attack where the RAM is put back and the machine recovers from sleep mode as if the RAM was never removed, therefore bypassing other security mechanism in the computing platform.

The watchdog is a relatively short timer, for example one second, such that when the watchdog expires, the recovery process (e.g., shutdown) is triggered. The caretaker process (e.g., PCU) will "kick the dog" after each success RAM read, thus resetting the watchdog and avoiding shutdown for another timer cycle. For the attack to succeed in this scenario, the attacker would have to know the timing of the watchdog timer, and then remove/read/replace the RAM within the timer period (e.g., under a second). In this manner, the recovery operation of shutting the computer down is used to defeat this type of remove/replace attack. When the computer comes back up (assuming that the user does not notice that it was shut down and that there may have been some tampering), the BIOS or UEFI or operating system may initialize the RAM contents so that any modifications would be ignored or rendered irrelevant.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

A processor subsystem may be used to execute the instruction on the machine-readable medium. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Circuitry or circuits, as used in this document, may comprise, for example, singly or in any combination, hardwired circuitry, programmable circuitry such as computer processors comprising one or more individual instruction processing cores, state machine circuitry, and/or firmware that stores instructions executed by programmable circuitry. The circuits, circuitry, or modules may, collectively or individually, be embodied as circuitry that forms part of a larger system, for example, an integrated circuit (IC), system on-chip (SoC), desktop computers, laptop computers, tablet computers, servers, smart phones, etc.

Additional Notes & Examples

Example 1 is an integrated circuit to monitor main memory, the integrated circuit and memory disposed in a computer system, the integrated circuit comprising: a detection circuit to detect that the computer system enters a sleep state; a test circuit to test for the presence of the main memory; and a recovery circuit to perform a recovery process when the test fails.

In Example 2, the subject matter of Example 1 optionally includes wherein the test for the presence of the main memory is performed periodically.

In Example 3, the subject matter of any one or more of Examples 1-2 optionally include wherein to test for the presence of the main memory, the test circuit is to access an address in the main memory.

In Example 4, the subject matter of Example 3 optionally includes wherein the address is a random address in main memory.

In Example 5, the subject matter of any one or more of Examples 3-4 optionally include wherein accessing the address is performed periodically.

In Example 6, the subject matter of any one or more of Examples 1-5 optionally include wherein to test the presence of the main memory, the test circuit is to: initiate a watchdog timer; attempt to access contents of the main memory; and reset the watchdog timer when the attempt to access contents is successful.

In Example 7, the subject matter of Example 6 optionally includes wherein the recovery process is performed when the watchdog timer expires.

In Example 8, the subject matter of any one or more of Examples 1-7 optionally include or 7, wherein the recovery process comprises shutting down the system.

In Example 9, the subject matter of any one or more of Examples 1-8 optionally include or 7, wherein the recovery process comprises writing to an event log.

In Example 10, the subject matter of any one or more of Examples 1-9 optionally include wherein the integrated circuit is incorporated in a power control unit.

Example 11 is a method of monitoring main memory in a system, the method comprising: detecting at a caretaker processor of the system that the system enters a sleep state; testing, by the caretaker processor, for the presence of a main memory of the system; and performing a recovery process when the testing fails.

In Example 12, the subject matter of Example 11 optionally includes wherein testing the presence of the main memory is performed periodically.

In Example 13, the subject matter of any one or more of Examples 11-12 optionally include wherein testing the presence of the main memory comprises accessing an address in the main memory.

In Example 14, the subject matter of Example 13 optionally includes wherein the address is a random address in main memory.

In Example 15, the subject matter of any one or more of Examples 13-14 optionally include wherein accessing the address is performed periodically.

In Example 16, the subject matter of any one or more of Examples 11-15 optionally include wherein testing the presence of the main memory comprises: initiating a watchdog timer; attempting to access contents of the main memory; and resetting the watchdog timer when the attempt to access contents is successful.

In Example 17, the subject matter of Example 16 optionally includes wherein the recovery process is performed when the watchdog timer expires.

In Example 18, the subject matter of any one or more of Examples 11-17 optionally include or 17, wherein the recovery process comprises shutting down the system.

In Example 19, the subject matter of any one or more of Examples 11-18 optionally include or 17, wherein the recovery process comprises writing to an event log.

In Example 20, the subject matter of any one or more of Examples 11-19 optionally include wherein the caretaker processor is a power control unit.

Example 21 is at least one machine-readable medium including instructions, which when executed by a machine, cause the machine to perform operations of any of the methods of Examples 11-20.

Example 22 is an apparatus comprising means for performing any of the methods of Examples 11-20.

Example 23 is an apparatus for monitoring main memory in a system, the apparatus comprising: means for detecting at a caretaker processor of the system that the system enters a sleep state; means for testing, by the caretaker processor, for the presence of a main memory of the system; and means for performing a recovery process when the testing fails.

In Example 24, the subject matter of Example 23 optionally includes wherein testing the presence of the main memory is performed periodically.

In Example 25, the subject matter of any one or more of Examples 23-24 optionally include wherein the means for testing the presence of the main memory comprise means for accessing an address in the main memory.

In Example 26, the subject matter of Example 25 optionally includes wherein the address is a random address in main memory.

In Example 27, the subject matter of any one or more of Examples 25-26 optionally include wherein accessing the address is performed periodically.

In Example 28, the subject matter of any one or more of Examples 23-27 optionally include wherein the means for testing the presence of the main memory comprise: means for initiating a watchdog timer; means for attempting to access contents of the main memory; and means for resetting the watchdog timer when the attempt to access contents is successful.

In Example 29, the subject matter of Example 28 optionally includes wherein the recovery process is performed when the watchdog timer expires.

In Example 30, the subject matter of any one or more of Examples 23-29 optionally include or 29, wherein the recovery process comprises shutting down the system.

In Example 31, the subject matter of any one or more of Examples 23-30 optionally include or 29, wherein the recovery process comprises writing to an event log.

In Example 32, the subject matter of any one or more of Examples 23-31 optionally include wherein the caretaker processor is a power control unit.

Example 33 is at least one machine-readable medium including instructions for monitoring main memory in a system, which when executed by a machine, cause the machine to: detect at a caretaker processor of the system that the system enters a sleep state; test, by the caretaker processor, for the presence of a main memory of the system; and perform a recovery process when the testing fails.

In Example 34, the subject matter of Example 33 optionally includes wherein testing the presence of the main memory is performed periodically.

In Example 35, the subject matter of any one or more of Examples 33-34 optionally include wherein the instructions to test the presence of the main memory comprise instructions to access an address in the main memory.

In Example 36, the subject matter of Example 35 optionally includes wherein the address is a random address in main memory.

In Example 37, the subject matter of any one or more of Examples 35-36 optionally include wherein accessing the address is performed periodically.

In Example 38, the subject matter of any one or more of Examples 33-37 optionally include wherein the instructions to test the presence of the main memory comprise instructions to: initiating a watchdog timer; attempting to access contents of the main memory; and resetting the watchdog timer when the attempt to access contents is successful.

In Example 39, the subject matter of Example 38 optionally includes wherein the recovery process is performed when the watchdog timer expires.

In Example 40, the subject matter of any one or more of Examples 33-39 optionally include or 39, wherein the recovery process comprises shutting down the system.

In Example 41, the subject matter of any one or more of Examples 33-40 optionally include or 39, wherein the recovery process comprises writing to an event log.

In Example 42, the subject matter of any one or more of Examples 33-41 optionally include wherein the caretaker processor is a power control unit.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. An integrated circuit to monitor main memory, the integrated circuit and the main memory disposed in a computer system, the integrated circuit comprising:
    a detection circuit to detect that the computer system enters a sleep state;
    a test circuit to test whether the main memory is still installed in the computer system by attempting to read from a memory address in the main memory and determining that the main memory is no longer installed in the computer system by detecting that the memory address is inaccessible; and
    a recovery circuit to perform a recovery process when the test indicates that the main memory is no longer installed in the computer system.

2. The integrated circuit of claim 1, wherein the test for whether the main memory is still installed in the computer system is performed periodically.

3. The integrated circuit of claim 1, wherein to test for whether the main memory is still installed in the computer system, the test circuit is to attempt to access the address in the main memory.

4. The integrated circuit of claim 3, wherein the address is a random address in main memory.

5. The integrated circuit of claim 3, wherein accessing the address is performed periodically.

6. The integrated circuit of claim 1, wherein to test whether the main memory is still installed in the computer system, the test circuit is to:
    initiate a watchdog timer;
    attempt to access contents of the main memory; and
    reset the watchdog timer when the attempt to access contents is successful.

7. The integrated circuit of claim 6, wherein the recovery process is performed when the watchdog timer expires.

8. The integrated circuit of claim 1, wherein the recovery process comprises shutting down the computer system.

9. The integrated circuit of claim 1, wherein the recovery process comprises writing to an event log.

10. The integrated circuit of claim 1, wherein the integrated circuit is incorporated in a power control unit.

11. A method of monitoring main memory in a system, the method comprising:
    detecting at a caretaker processor of the system that the system enters a sleep state;
    testing, by the caretaker processor, whether the main memory of the system is still installed in the system by attempting to read from a memory address in the main memory and determining that the main memory is no longer installed in the system by detecting that the memory address is inaccessible; and
    performing a recovery process when the testing indicates that the main memory is no longer installed in the system.

12. The method of claim 11, wherein testing whether the main memory is still installed in the system is performed periodically.

13. The method of claim 11, wherein testing whether the main memory is still installed in the system comprises attempt to access the address in the main memory.

14. The method of claim 13, wherein the address is a random address in main memory.

15. The method of claim 13, wherein accessing the address is performed periodically.

16. The method of claim 11, wherein testing whether the main memory is still installed in the system comprises:
    initiating a watchdog timer;
    attempting to access contents of the main memory; and
    resetting the watchdog timer when the attempt to access contents is successful.

17. The method of claim 16, wherein the recovery process is performed when the watchdog timer expires.

18. The method of claim 11, wherein the recovery process comprises shutting down the system.

19. The method of claim 11, wherein the recovery process comprises writing to an event log.

20. The method of claim 11, wherein the caretaker processor is a power control unit.

21. At least one non-transitory machine-readable medium including instructions for monitoring main memory in a system, which when executed by a machine, cause the machine to:
   detect at a caretaker processor of the system that the system enters a sleep state;
   test, by the caretaker processor, whether the main memory of the system is still installed in the system by attempting to read from a memory address in the main memory and determining that the main memory is no longer installed in the system by detecting that the memory address is inaccessible; and
   perform a recovery process when the testing indicates that the main memory is no longer installed in the system.

22. The non-transitory machine-readable medium of claim 21, wherein testing whether the main memory is still installed in the system is performed periodically.

23. The non-transitory machine-readable medium of claim 21, wherein the instructions to test whether the main memory is still installed in the system comprise instructions to attempt to access the address in the main memory.

24. The non-transitory machine-readable medium of claim 23, wherein the address is a random address in main memory.

25. The non-transitory machine-readable medium of claim 23, wherein accessing the address is performed periodically.

* * * * *